United States Patent
Kobayashi

(10) Patent No.: US 11,056,007 B2
(45) Date of Patent: Jul. 6, 2021

(54) VEHICLE MOVEMENT NOTIFICATION DEVICE AND NOTIFICATION METHOD

(71) Applicant: TOYOTA JIDOSHA KABUSHIKI KAISHA, Toyota (JP)

(72) Inventor: Yasumasa Kobayashi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/285,802

(22) Filed: Feb. 26, 2019

(65) Prior Publication Data

US 2019/0266896 A1 Aug. 29, 2019

(30) Foreign Application Priority Data

Feb. 28, 2018 (JP) .............................. JP2018-035358

(51) Int. Cl.
| | |
|---|---|
| *G08G 1/00* | (2006.01) |
| *B60R 25/20* | (2013.01) |
| *B60R 25/24* | (2013.01) |
| *G06Q 10/00* | (2012.01) |
| *G06F 21/00* | (2013.01) |

(Continued)

(52) U.S. Cl.
CPC .............. *G08G 1/20* (2013.01); *B60R 25/209* (2013.01); *B60R 25/24* (2013.01); *G06F 21/00* (2013.01); *G06Q 10/00* (2013.01); *G08G 1/005* (2013.01); *G08G 1/205* (2013.01); *H04W 4/00* (2013.01); *B60R 2325/205* (2013.01)

(58) Field of Classification Search
CPC . B60R 2325/205; B60R 25/209; B60R 25/24; G06F 21/00; G06Q 10/00; G06Q 30/0645; G08G 1/005; G08G 1/20; G08G 1/205; H04W 4/00; H04W 4/029; H04W 4/44

See application file for complete search history.

(56) References Cited

U.S. PATENT DOCUMENTS

| | | | |
|---|---|---|---|
| 2003/0151501 A1* | 8/2003 | Teckchandani | B60R 25/102 340/426.19 |
| 2014/0129053 A1* | 5/2014 | Kleve | B60R 25/24 701/2 |
| 2019/0001927 A1* | 1/2019 | Hermann | B60R 25/245 |

FOREIGN PATENT DOCUMENTS

| | | |
|---|---|---|
| CN | 106553617 A | 4/2017 |
| JP | 2005-104327 A | 4/2005 |

(Continued)

*Primary Examiner* — Omeed Alizada
(74) *Attorney, Agent, or Firm* — Hunton Andrews Kurth LLP

(57) ABSTRACT

A vehicle movement notification device includes a receiver configured to receive a notification of movement of a vehicle, when the vehicle is moved in a state where a user of the vehicle is absent; and a controller configured to acquire location information of the vehicle after the movement, and transmit the location information of the vehicle to a terminal owned by the user. The vehicle is a vehicle adopting a key system according to which locking/unlocking is performed based on reception of key information transmitted from the terminal. The movement of the vehicle is performed by unlocking of the vehicle and starting of a drive source performed by using the key information of the vehicle, by a first user who is different from the user of the vehicle and who owns a first terminal where the key information of the vehicle is received.

5 Claims, 10 Drawing Sheets

(51) Int. Cl.
*H04W 4/00* (2018.01)
*G08G 1/005* (2006.01)

(56) References Cited

FOREIGN PATENT DOCUMENTS

| | | |
|---|---|---|
| JP | 2007-328602 A | 12/2007 |
| JP | 2015-169008 A | 9/2015 |

* cited by examiner

FIG. 8

| VEHICLE ID | VEHICLE INFORMATION | | | AUTHENTICATION INFORMATION | VEICLE LOCATION | DRIVER TERMINAL ID |
|---|---|---|---|---|---|---|
| | MODEL | COLOR | NUMBER | | | |
| V001 | AAA | WHITE | OO×× | XXYYZZ | ....... | T110 |

VEHICLE MOVEMENT NOTIFICATION DEVICE AND NOTIFICATION METHOD

CROSS-REFERENCE TO RELATED APPLICATION

This application claims the benefit of Japanese Patent Application No. 2018-035358, filed on Feb. 28, 2018, which is hereby incorporated by reference herein in its entirety.

BACKGROUND

Technical Field

The present disclosure relates to a vehicle movement notification device and a notification method.

Description of the Related Art

In recent years, systems which enable a mobile terminal such as a smartphone to be used as a key of a vehicle are being developed (for example, see Japanese Patent Laid-Open No. 2015-169008). According to such a system, when key information associated with a vehicle is transmitted from a mobile terminal to the vehicle, locking/unlocking of the vehicle is performed, and driving of the vehicle is enabled. There are also disclosed techniques for enabling a third person to unlock and start an engine of a parked vehicle, and for enabling anyone to move the vehicle (for example, see Japanese Patent Laid-Open No. 2007-328602 and Japanese Patent Laid-Open No. 2005-104327).

CITATION LIST

Patent Document

Patent document 1: Japanese Patent Laid-Open No. 2015-169008
Patent document 2: Japanese Patent Laid-Open No. 2007-328602
Patent document 3: Japanese Patent Laid-Open No. 2005-104327

For example, in a case where a parked vehicle is moved in absence of a user by a third person who acquired key information of the parked vehicle using a mobile terminal, the user of the vehicle is not able to know a location of the vehicle after it is moved. For example, when the user of the vehicle returns to an original parking location, the vehicle would be absent, and this may lead to confusion. Such a problem is also caused when a third person moves a vehicle other than vehicles to which the system that enables use of a mobile terminal as a key of a vehicle is applied.

The present disclosure has been made in view of such circumstances, and has its object to provide a vehicle movement notification device and a notification method which are capable of letting a user of a vehicle know a location of the vehicle after movement, when the vehicle is unlocked and moved by a third person.

SUMMARY

An aspect of the present disclosure is a vehicle movement notification device including a receiver configured to receive a notification of movement of a vehicle, when the vehicle is moved in a state where a user of the vehicle is absent; and a controller configured to acquire location information of the vehicle after the movement, and transmit the location information of the vehicle to a terminal owned by the user. The notification device further includes a storage that stores an association between information about the vehicle and information about the user, and the controller may acquire the information about the user that is associated with the vehicle from the storage, in a case where the notification of movement of the vehicle is received.

According to an aspect of the present disclosure, a vehicle user can know the location of a vehicle after movement, in a case where the vehicle is moved while the user is absent.

According to an aspect of the present disclosure, the vehicle may be a vehicle adopting a key system that locking/unlocking is performed based on reception of key information transmitted from the terminal. The movement of the vehicle may be performed by unlocking of the vehicle and starting of a drive source performed by using the key information of the vehicle, by a first user who is different from the user of the vehicle and who owns a first terminal where the key information of the vehicle is received. In this case, the vehicle movement notification device may further include a transmitter configured to transmit the key information of the vehicle to a terminal of the first user, in a case where there is occurrence of a request for movement of the vehicle. The vehicle may thereby be locked/unlocked and moved by a third person, by transmission of the key information to a first terminal of the first user, who is the third person. In the case where the vehicle is moved, the user of the vehicle is notified of the location information of the vehicle after movement, and confusion can be prevented.

According to an aspect of the present disclosure, the controller may notify of information about the first user, together with the location information of the vehicle after movement. The user of the vehicle may thereby acquire the information about the first user who moved the vehicle, and may feel safe about letting a third person move the vehicle. A deterrent effect on crime such as theft of objects inside the vehicle may be achieved with respect to the third person who moves the vehicle.

According to an aspect of the present disclosure, the controller may transmit, together with the location information of the vehicle after the movement, a notification indicating that the key information of the vehicle received by the first terminal is already invalidated. The user of the vehicle may thereby check that the first user who moved the vehicle is disabled from further unlocking of the vehicle, and the user may feel safe about security of the vehicle.

The vehicle movement notification device of the present disclosure may be a system including one or a plurality of processing devices, such as computers. In the case where the notification device is made up of a plurality of processing devices, components of the notification device are provided being distributed over the plurality of processing devices, and the processing devices may perform processing of the system in cooperation with each other.

The present disclosure may also be understood as a vehicle movement notification method. The vehicle movement notification method includes receiving a notification of movement of a vehicle, when the vehicle is moved in a state where a user of the vehicle is absent; and acquiring location information of the vehicle after the movement, and transmitting the location information of the vehicle to a terminal owned by the user. The technical idea disclosed above with respect to the vehicle movement notification device may also be applied to the vehicle movement notification method to the extent that no technical conflict exists.

According to the present disclosure, a user of a vehicle may know a location of the vehicle after movement, when the vehicle is unlocked and moved by a third person.

BRIEF DESCRIPTION OF DRAWINGS

FIG. 8 is an example of the vehicle management information table;

DESCRIPTION OF THE EMBODIMENT

Hereinafter, an embodiment of the present disclosure will be described with reference to the drawings. The following configuration of the embodiment is merely an example, and the present disclosure is not limited to the configuration of the embodiment.

First Embodiment

Key System Overview

Figure 1:
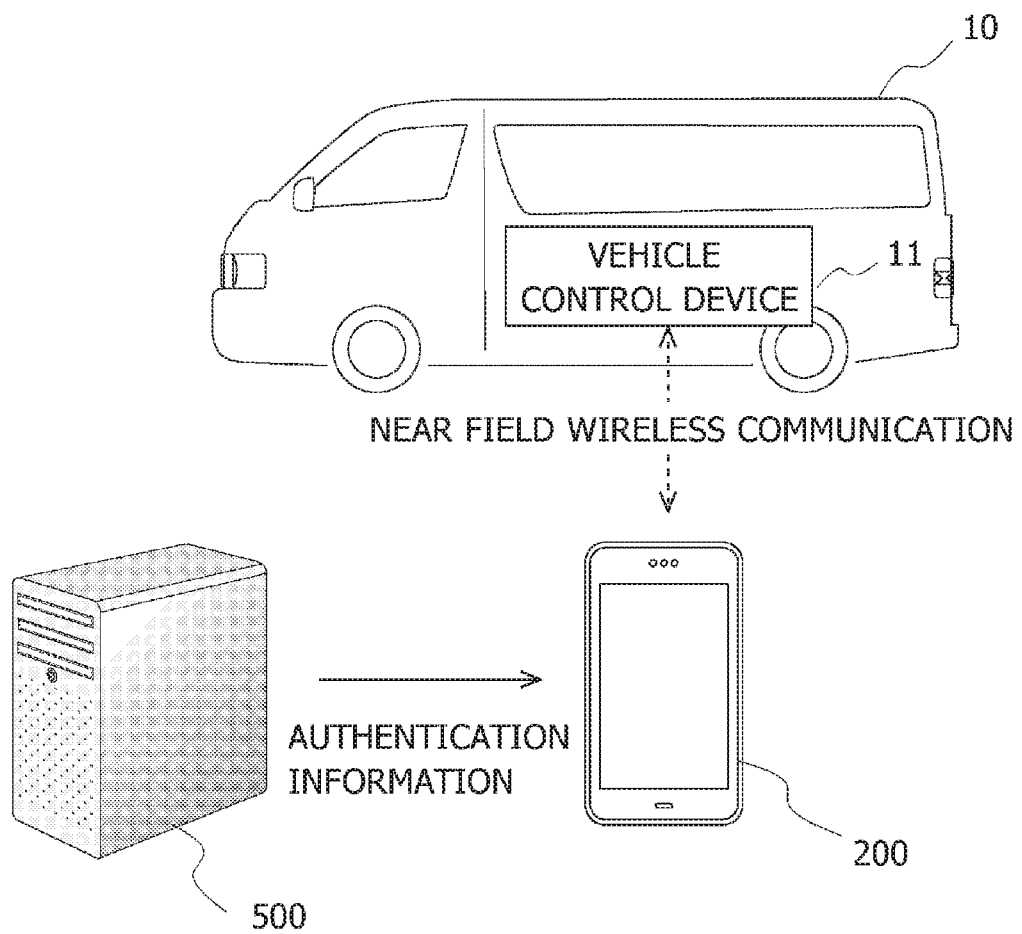
FIG. 1 is a diagram illustrating an overview of a key system according to a first embodiment.

FIG. 1 is a diagram illustrating an overview of a key system according to a first embodiment. The key system according to the first embodiment includes a vehicle control device 11 mounted in a vehicle 10, a user terminal 200, and a center server 500. The user terminal 200 and the center server 500 are connected to each other by a network such as the Internet, which is a public communication network. The user terminal 200 and the vehicle control device 11 are connected to each other by near field wireless communication.

The center server 500 is a device that manages authentication information which is associated with the vehicle 10. The user terminal 200 becomes usable as a key of the vehicle 10 upon reception of the authentication information delivered from the center server 500. When the user terminal 200 is to be used as the key of the vehicle 10, the user terminal 200 transmits the authentication information received from the center server 500 to the vehicle control device 11 mounted in the vehicle 10 by near field wireless communication. The vehicle control device 11 performs authentication by using the authentication information received from the user terminal 200. If authentication succeeds, the vehicle control device 11 is enabled to perform various types of control on the vehicle 10. Control on the vehicle 10 by the vehicle control device 11 may be locking/unlocking of a door of the vehicle 10, driving of the vehicle 10, and the like. The authentication information is an example of "key information". The center server 500 is an example of a "notification device".

System Configuration of Key System

Figure 2:
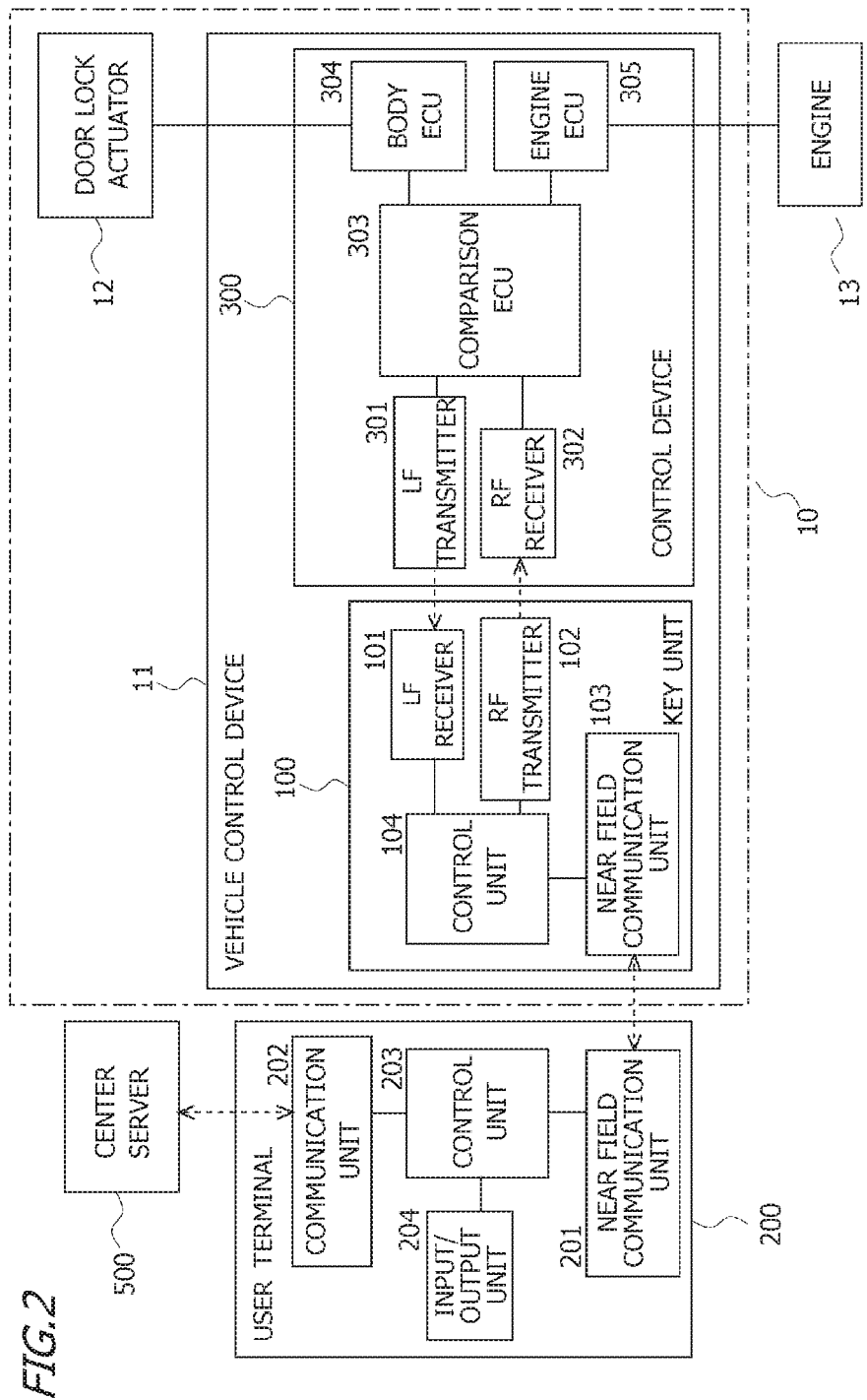
FIG. 2 is an example of a system configuration of the key system according to the first embodiment.

FIG. 2 is an example of a system configuration of the key system according to the first embodiment. FIG. 2 is a block diagram schematically illustrating example configurations of the user terminal 200 and the vehicle control device 11 illustrated in FIG. 1. The vehicle control device 11 includes a key unit 100 that performs communication with the user terminal 200, and a control device 300 that performs various types of control on the vehicle 10.

The control device 300 performs various types of control by transmitting/receiving, to/from the key unit 100, radio waves in a radio frequency (RF) band and a low frequency (LF) band inside the vehicle 10. For example, the control device 300 performs lock/unlock control of locking and unlocking a door of the vehicle 10 by controlling a door lock actuator 12 of the vehicle 10. The control device 300 also performs engine control, such as start control for starting an engine 13, which is a drive source of the vehicle 10.

The control device 300 includes an LF transmitter 301, an RF receiver 302, a comparison ECU 303, a body ECU (Electronic Control Unit) 304, and an engine ECU 305. The LF transmitter 301 is a device that transmits radio waves in an LF band (for example, 100 KHz to 300 KHz) to search (poll) for the key unit 100. The RF receiver 302 is a device that receives radio waves in an RF band (for example, 100 MHz to 1 GHz) which are transmitted from the key unit 100.

The comparison ECU 303 is a computer that controls the body ECU 304 and the engine ECU 305 based on a command signal received from the key unit 100 by radio waves in the RF band. The comparison ECU 303 is a microcomputer, for example. The comparison ECU 303 performs authentication regarding whether a command signal transmitted from the key unit 100 is transmitted from a valid device. Specifically, whether a key ID included in a command signal matches a key ID stored in advance in a storage unit of the comparison ECU 303 is determined.

When the key ID is successfully authenticated, the comparison ECU 303 transmits a command according to the command signal to the body ECU 304 and the engine ECU 305 through an in-vehicle network such as a controller area network (CAN). Specifically, if the command signal received from the key unit 100 is a lock signal, the comparison ECU 303 transmits, to the body ECU 304, a lock command for locking the vehicle 10. If the command signal received from the key unit 100 is an unlock signal, the comparison ECU 303 transmits, to the body ECU 304, an unlock command for unlocking the vehicle 10. If the command signal received from the key unit 100 is an engine start permission signal, the comparison ECU 303 transmits, to the engine ECU 305, an engine start permission command for placing the engine 13 of the vehicle 10 in a state where the engine 13 can be started.

The body ECU 304 is a computer that performs body control of the vehicle 10. The body ECU 304 is electrically connected to the door lock actuator 12 that locks and unlocks the door of the vehicle 10. The body ECU 304 includes a function of unlocking/locking the vehicle 10 by controlling the door lock actuator 12 based on an unlock command or a lock command received from the comparison ECU 303.

The engine ECU 305 is a computer that controls the engine 13 of the vehicle 10. The engine ECU 305 is electrically connected to various pieces of equipment for controlling the engine 13, such as a fuel injection valve, a spark plug, a throttle valve, and a starter (none of which is illustrated). When the engine start permission command is received from the comparison ECU 303, the engine ECU 305 is placed in an engine start enabled state in which the engine 13 which is stopped can be started. Additionally, the engine start enabled state is a state in which, when an ignition switch (or a push start switch) of the vehicle 10 is switched on, start control for the engine 13 can be performed by the engine ECU 305. Additionally, a drive source of the vehicle 10 is not limited to the engine, and may alternatively be a motor, for example.

Next, the key unit 100 will be described. The key unit 100 is a device which is arranged at a predetermined position in a vehicle interior of the vehicle 10 (such as inside a glove box). The key unit 100 includes a function of authenticating a user terminal 200 by performing near field wireless communication with the user terminal 200, and a function of transmitting, based on the authentication result, a command signal to the control device 300 by using radio waves in the RF band. The key unit 100 includes an LF receiver 101, an RF transmitter 102, a near field communication unit 103, and a control unit 104.

The LF receiver 101 is a device that receives, from the control device 300, a polling signal which is transmitted by radio waves in the LF band. The RF transmitter 102 is a device that transmits a command signal to the control device 300 by radio waves in the RF band. The near field communication unit 103 is a device that performs communication with the user terminal 200 outside the vehicle 10. The near field communication unit 103 performs communication in a near field (approximately a range allowing communication between the vehicle interior and a vehicle exterior) by using a predetermined wireless communication standard. As the communication standard which can be used for communication by the near field communication unit 103, Bluetooth (registered trademark) Low Energy standard, near field communication (NFC), ultra wideband (UWB), WiFi (registered trademark), and the like may be cited.

The control unit 104 is a computer that performs a process for near field wireless communication with the user terminal 200, a process for authenticating the user terminal 200, a process for transmitting a command signal to the control device 300, and the like. For example, the control unit 104 is a microcomputer.

The control unit 104 includes functions of controlling the LF receiver 101, the RF transmitter 102, and the near field communication unit 103. The control unit 104 performs authentication of authentication information included in a control request transmitted from the user terminal 200 by near field wireless communication. Specifically, whether the authentication information transmitted from the user terminal 200 and authentication information which is stored in advance in a storage unit of the control unit 104 match each other or not is determined. When the authentication succeeds, the control unit 104 transmits, to the control device 300 through the RF transmitter 102, a command signal according to the control request received from the user terminal 200. Specifically, if the control request received from the user terminal 200 is a lock request, the control unit 104 transmits a lock signal to the control device 300. If the control request received from the user terminal 200 is an unlock request, the control unit 104 transmits, to the control device 300, an unlock signal and an engine start permission signal.

At this time, the key unit 100 transmits a key ID to the control device 300, together with the command signal. The key ID may be stored in advance in the key unit 100 in the form of a plaintext, or may be stored encrypted in code unique to the user terminal 200. In the case where the key ID is stored in an encrypted state, the encrypted key ID may be decrypted by the authentication information transmitted from the user terminal 200, and an original key ID may be obtained.

Next, the user terminal 200 will be described. For example, the user terminal 200 is a small computer such as a smartphone, a mobile telephone terminal, a tablet terminal, a personal digital assistant, or a wearable computer (such as a smart watch). The user terminal 200 includes a near field communication unit 201, a communication unit 202, a control unit 203, and an input/output unit 204.

The near field communication unit 201 is a device that performs communication with the key unit 100 of the vehicle control device 11 by the same communication standard as the near field communication unit 103. The communication unit 202 is a device for connecting the user terminal 200 to a network to perform communication with the center server 500. The communication unit 202 is capable of communicating with the center server 500 through the network by using a mobile communication service such as 3G or LTE. Additionally, the communication unit 202 of the user terminal 200 also performs communication, through the network, with a terminal management server that manages the user terminal.

The control unit 203 is a computer in charge of controlling the user terminal 200. The control unit 203 is a microcomputer, for example. The control unit 203 performs a process of receiving, through the communication unit 202, authentication information sent from the center server 500. Additionally, the authentication information which is received from the center server 500 is stored in a storage unit of the control unit 203. The control unit 203 performs a process of generating a control request according to an input operation of a terminal user, who is a user who owns the user terminal 200, and of transmitting the control request to the key unit 100 through the near field communication unit 201, together with the authentication information which is stored in the storage unit.

The input/output unit 204 functions as means that receives an input operation performed by the terminal user, and that presents information to the terminal user. Specifically, the input/output unit 204 includes a touch panel display and control means therefor. The input/output unit 204 may include a hardware switch to be operated by the terminal user, for example. The input/output unit 204 may further include a speaker that outputs sound or audio by being controlled by the control unit 203.

Operation of Key System

Figure 3:
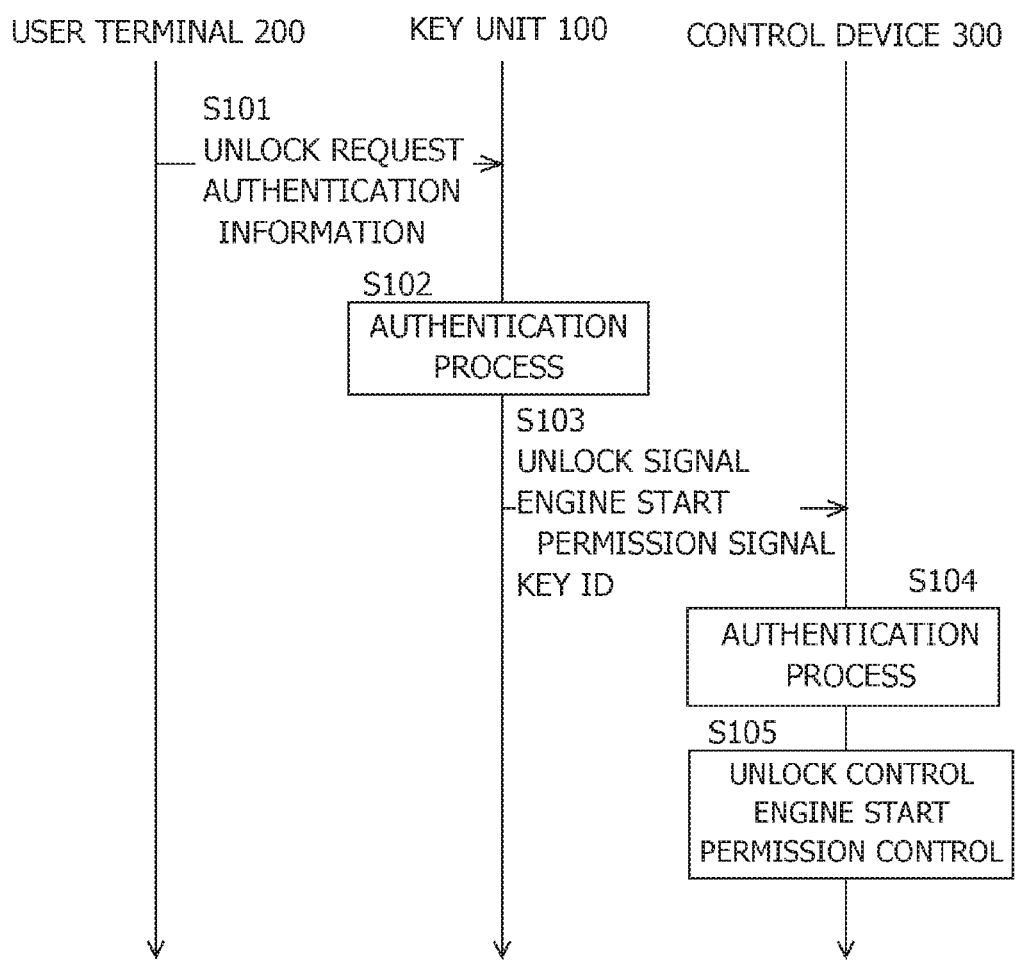
FIG. 3 is a diagram illustrating a flow of processes and data at the time of unlocking of the door of the vehicle.

Operation of the key system at the time of a user controlling the vehicle 10 by using the user terminal 200 will be described citing a case of unlocking the door of the vehicle 10 as an example. FIG. 3 is a diagram illustrating a flow of processes and data at the time of unlocking of the door of the vehicle 10.

When a user performs, on the user terminal 200, an operation of unlocking the door of the vehicle 10, the user terminal 200 transmits authentication information to the key unit 100 of the vehicle control device 11, together with an unlock request (S101). Then, the key unit 100 performs an authentication process based on the authentication information received from the user terminal 200 (S102). When the authentication information is successfully authenticated, the key unit 100 transmits a key ID to the control device 300, together with an unlock signal and an engine start permission signal (S103). Then, the control device 300 performs an authentication process based on the key ID received from the key unit 100 (S104). When the key ID is successfully authenticated, the control device 300 performs unlock control of unlocking the door of the vehicle 10, and engine start permission control of placing the engine ECU 305 in a state where the engine can be started (S105).

Key Information Management System

Next, a description will be given of a key information management system that sends authentication information of a vehicle adopting the key system as described above to the user terminal of a third person other than the user of the vehicle so as to enable the third person to move the vehicle, for example. If there is a vehicle parked in a street on a route of an emergency vehicle, this may result in delay in arrival of the emergency vehicle at a site. The key information management system according to the first embodiment is a key information management system that temporarily sends authentication information of a vehicle, the user of which is absent, to the user terminal of a third person in a case where a movement request for the vehicle occurs, so as to enable the third person to move the vehicle.

The third person is a user other than a user who is successfully authenticated as a legitimate user and who holds a terminal to which the authentication information of a vehicle is already sent. A user of a vehicle is a user who is successfully authenticated as a legitimate user. More specifically, a user of a vehicle is a driver of the vehicle, for example. A person who can be the driver of a vehicle is an owner of the vehicle, a family of the owner, an employee of the owner, and a user who is permitted by the owner of the vehicle to use the vehicle, for example. In the case where the vehicle is a shared vehicle which is used by an unspecified large number of users, the user of the vehicle is a user for whom application to use the vehicle is granted through legitimate procedure.

Figure 4:
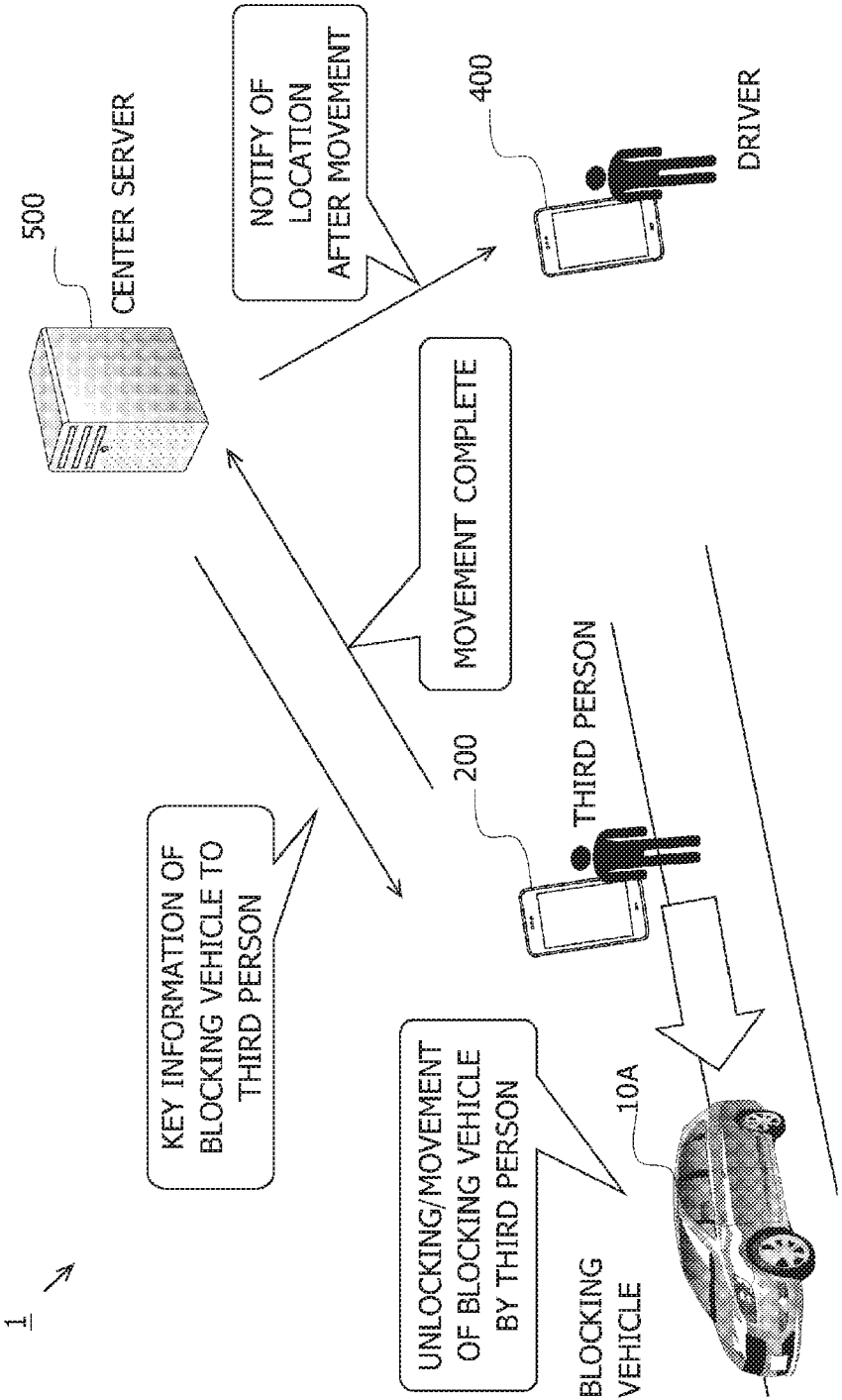
FIG. 4 is a diagram illustrating an example of a system configuration of a key information management system according to the first embodiment.

FIG. 4 is a diagram illustrating an example of a system configuration of a key information management system 1 according to the first embodiment. The key information management system 1 includes a vehicle 10A, a user terminal 400 of a driver of the vehicle 10A, the user terminal 200 of a third person, and the center server 500. The vehicle 10A, the user terminal 400 of a driver, and the user terminal 200 of a third person are connected to the center server 500 by a network such as the Internet, which is a public communication network, through a wireless access network, for example. In the following, the user terminal 200 of a third person may be referred to as "third person terminal 200". In the following, the user terminal 400 of a driver of the vehicle 10A may be referred to as "driver terminal 400".

The vehicle 10A is a vehicle adopting the key system, and is a vehicle which is parked in a street in a state where the driver is absent, and which is obstructing traffic of other vehicles, for example. In the following, a vehicle obstructing traffic of other vehicles will be referred to as a "blocking vehicle". The center server 500 manages authentication information and the like of the vehicle 10A adopting the key system. Additionally, a plurality of vehicles 10A are managed by the center server 500, but only one of them is extracted and illustrated in FIG. 4.

For example, in the case where an emergency vehicle is prevented from moving by a blocking vehicle 10A while heading to a site, an occupant (third person) of the emergency vehicle transmits a movement request for the blocking vehicle from the user terminal 200 to the center server 500. The emergency vehicle may be an ambulance, a fire engine, a police car or the like.

The center server 500 receives the movement request for the blocking vehicle from the third person terminal 200, for example, and transmits authentication information of the blocking vehicle 10A to the third person terminal 200. The third person terminal 200 stores, in a storage unit, the authentication information of the blocking vehicle 10A received from the center server 500.

For example, when an occupant of the emergency vehicle carrying the third person terminal 200 approaches the blocking vehicle 10A and performs an unlock operation on the third person terminal 200, the blocking vehicle 10A is unlocked and is placed in the engine start enabled state. When the occupant of the emergency vehicle gets in the blocking vehicle 10A and performs an operation of starting the engine, the engine of the blocking vehicle 10A is started, and the occupant of the emergency vehicle is enabled to move the blocking vehicle 10A. The blocking vehicle 10A may thereby be moved from the path of the emergency vehicle to another location, and the emergency vehicle is enabled to proceed on the path.

Transmission of the authentication information of the blocking vehicle 10A to the third person terminal 200 is not limited to a case as described above. For example, when the movement request for the blocking vehicle 10A is received, the center server 500 may transmit the authentication information of the blocking vehicle 10A to the user terminal 200 of a general user present in a periphery of the blocking vehicle 10A. A general user is a user other than occupants of an emergency vehicle, for example. When the movement request for the blocking vehicle 10A is received, the center server 500 may transmit the authentication information of the blocking vehicle 10A to the user terminal 200 of a predetermined user at a police station or a fire department having jurisdiction over an area including a current location of the blocking vehicle 10A.

For example, the center server 500 may receive a dispatch notification regarding an emergency vehicle, specify a blocking vehicle 10A on the route of the emergency vehicle, and transmit the authentication information of the blocking vehicle 10A to the third person terminal 200 of an occupant of the emergency vehicle, a general user in the periphery of the blocking vehicle 10A, and/or a predetermined user at a police station or a fire department having jurisdiction over an area including the current location of the blocking vehicle 10A.

An occupant of an emergency vehicle, a general user in the periphery of the blocking vehicle 10A, and a predetermined user at a police station or a fire department having jurisdiction over an area including the current location of the blocking vehicle 10A are all third persons to the blocking vehicle 10A.

In the first embodiment, the center server 500 detects unlocking and movement of the vehicle 10A by a third person, and notifies the driver terminal 400 of the vehicle 10A of location information of the vehicle 10A after movement, together with a vehicle movement notification. A driver of the vehicle 10A may thereby grasp the location information of the vehicle 10A after movement.

In the first embodiment, the center server 500 issues notification regarding information about the third person who moved the vehicle 10A and invalidation of the authentication information of the vehicle 10A transmitted to the third person terminal 200, together with the vehicle movement notification and the location information of the vehicle 10A after movement.

The blocking vehicle is an example of a "vehicle". The driver of the blocking vehicle 10A is an example of a "user of the vehicle". The user terminal 400 of the driver of the blocking vehicle 10A is an example of a "terminal owned by the user of the vehicle". An occupant of an emergency vehicle, a general user in the periphery of the blocking vehicle 10A, and a predetermined user at a police station or a fire department having jurisdiction over an area including the current location of the blocking vehicle 10A are each an example of a "first user who is different from the user of the vehicle and who owns a first terminal", for example. The third person terminal 200 is an example of a "first terminal".

Figure 5:
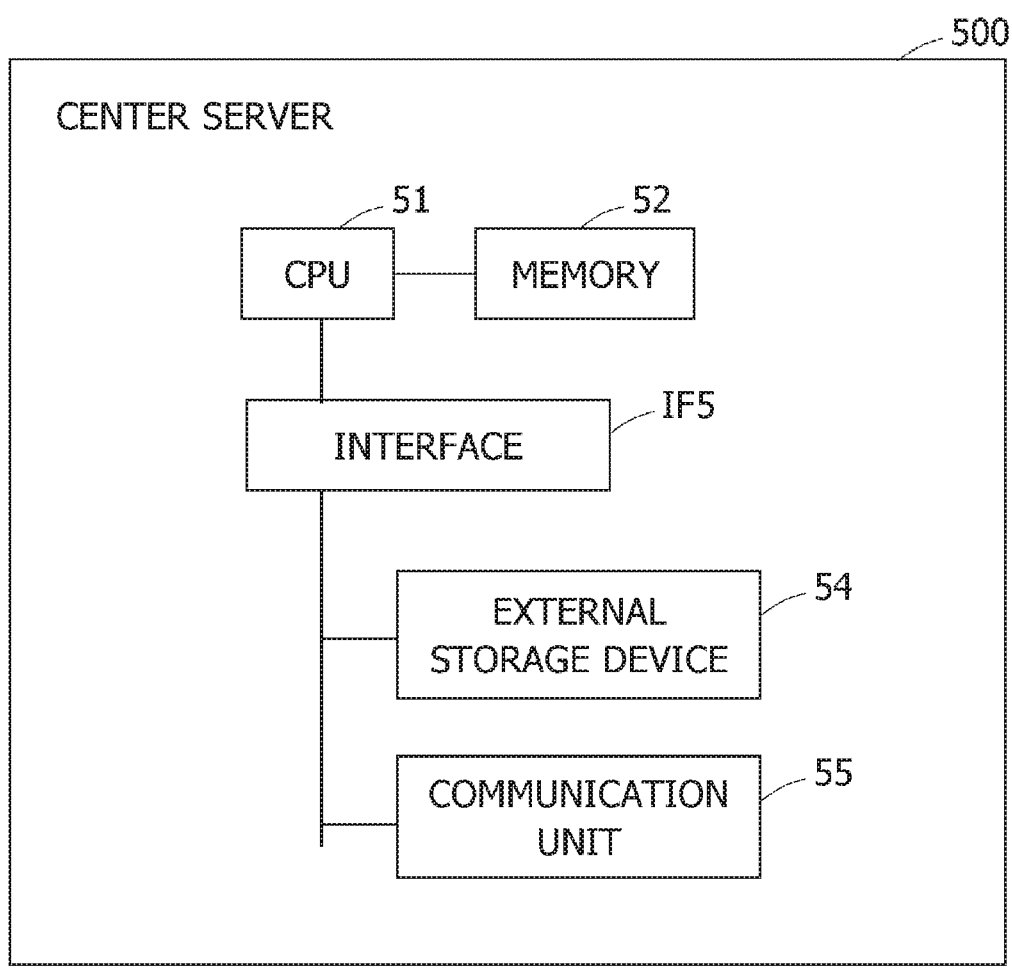
FIG. 5 is a diagram illustrating an example of a hardware configuration of the center server.

FIG. 5 is a diagram illustrating an example of a hardware configuration of the center server 500. The center server 500 includes a CPU 51, a memory 52, an interface IF5, an external storage device 54, and a communication unit 55. The CPU 51 executes a computer program developed in the memory 52 in an executable manner, and performs processing as the center server 500. The memory 52 stores computer programs to be executed by the CPU 51, data to be processed by the CPU 51, and the like. For example, the memory 52 is a dynamic random access memory (DRAM), a static random access memory (SRAM), or a read only memory (ROM).

The external storage device 54 and the communication unit 55 are connected to the interface IF5. The external storage device 54 is a non-volatile memory, and is a solid state drive (SSD), a hard disk drive or the like. The communication unit 55 is connected to a public communication line network through LAN, and communicates with various servers, the user terminal 200, and the vehicle 10A on the network through the public communication line network.

In FIG. 5, the interface IF5 is illustrated as an example, but transmission/reception of signals between the CPU 51 and a control target is not limited to be performed through the interface IF5. That is, the CPU 51 may include a plurality of signal transmission/reception paths other than the interface IF5. In FIG. 5, the center server 500 includes a single CPU 51. However, the CPU is not limited to a single processor, and may adopt a multiprocessor configuration. Alternatively, a single CPU connected by a single socket may have a multicore configuration. At least a part of processing by each unit described above may be performed by a processor other than the CPU, such as a dedicated processor such as a digital signal processor (DSP) or a graphics processing unit (GPU). At least a part of processing by each unit described above may be an integrated circuit (IC) or another digital circuit. An analog circuit may be included in at least a part of each unit described above.

Figure 6:
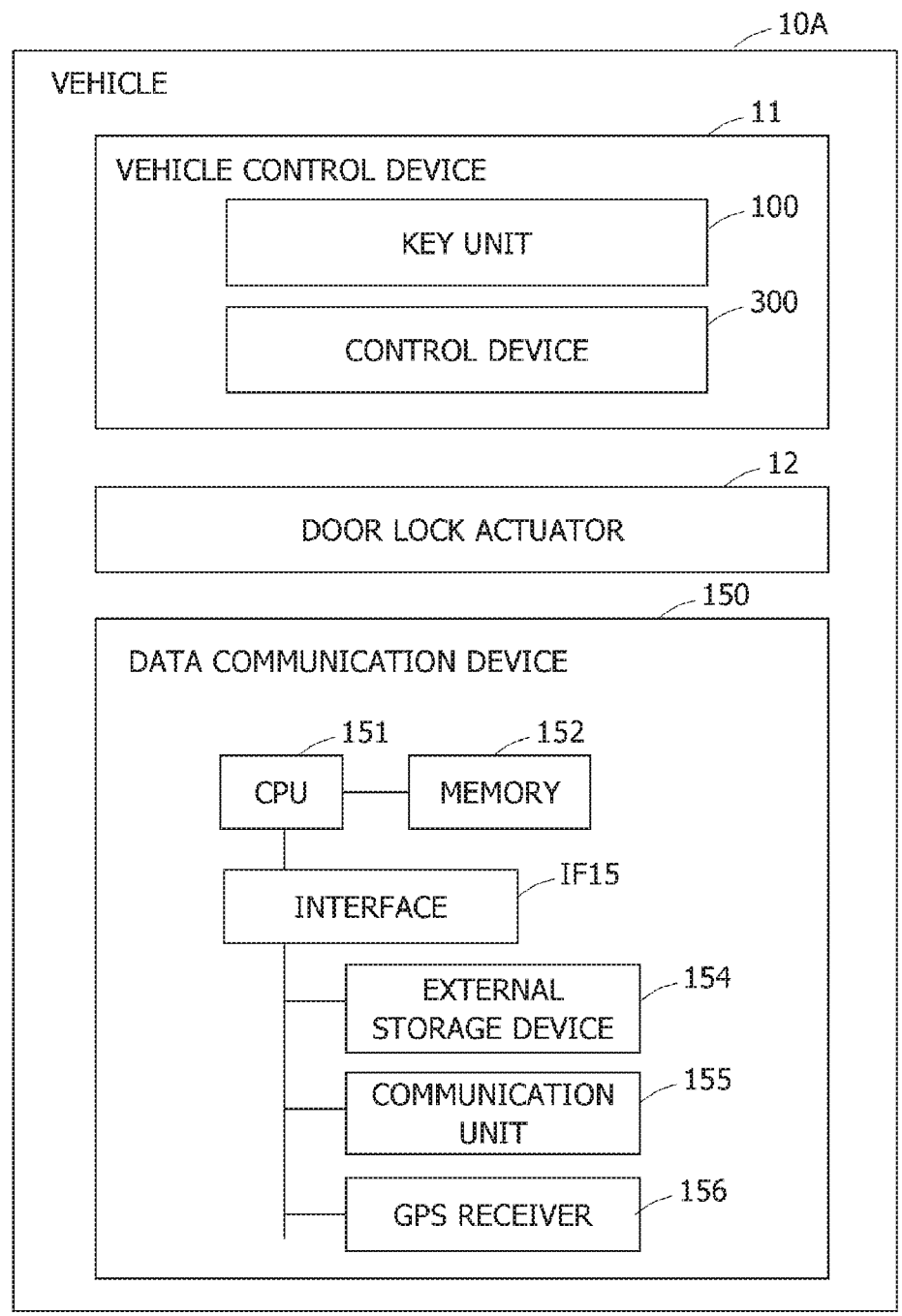
FIG. 6 is a diagram illustrating an example of a hardware configuration of the vehicle.

FIG. 6 is a diagram illustrating an example of a hardware configuration of the vehicle 10A. A hardware configuration related to control of the vehicle 10A is extracted and illustrated in FIG. 6, and a configuration related to traveling (such as an engine) is omitted. The vehicle 10A includes the vehicle control device 11, the door lock actuator 12, and a data communication device 150. The vehicle control device 11 and the door lock actuator 12 are as described above. The data communication device 150 is a device including a function of communicating with other devices such as the center server 500, for example.

For example, the data communication device 150 includes a CPU 151, a memory 152, an interface IF15, an external storage device 154, a communication unit 155, and a global positioning system (GPS) receiver 156. Configurations and effects of the CPU 151, the memory 152, the interface IF15, the external storage device 154, and the communication unit 155 are the same as those of the CPU 51, the memory 52, the interface IF5, the external storage device 54, and the communication unit 55 in FIG. 5.

The GPS receiver 156 receives radio waves of time signals from a plurality of satellites (global positioning satellites) orbiting around the earth, and stores the radio waves in a register, not illustrated, of the CPU 151. For example, the CPU 151 acquires location information of the vehicle 10A by calculating latitude and longitude indicating a location on the earth from a detection signal from the GPS receiver 156.

Additionally, the data communication device 150 is electrically connected to the vehicle control device 11 through a CAN or the like. Accordingly, for example, the data communication device 150 may receive, from the vehicle control device 11, a notification indicating that the door of the vehicle 10A was locked/unlocked, and may transmit the notification to the center server 500.

The hardware configuration of the vehicle 10A illustrated in FIG. 6 is merely an example, and the configuration illustrated in FIG. 6 is not restrictive. For example, the data communication device 150 may include a removable recording medium drive, and may perform processing by reading programs and data recorded in a removable recording medium. For example, the removable recording medium is a flexible disk, a magnetooptical disk, a CD-ROM, a CD-R/W, a DVD, a Blu-ray disc, a DAT, an 8 mm tape, or a memory card such as a flash memory.

Figure 7:
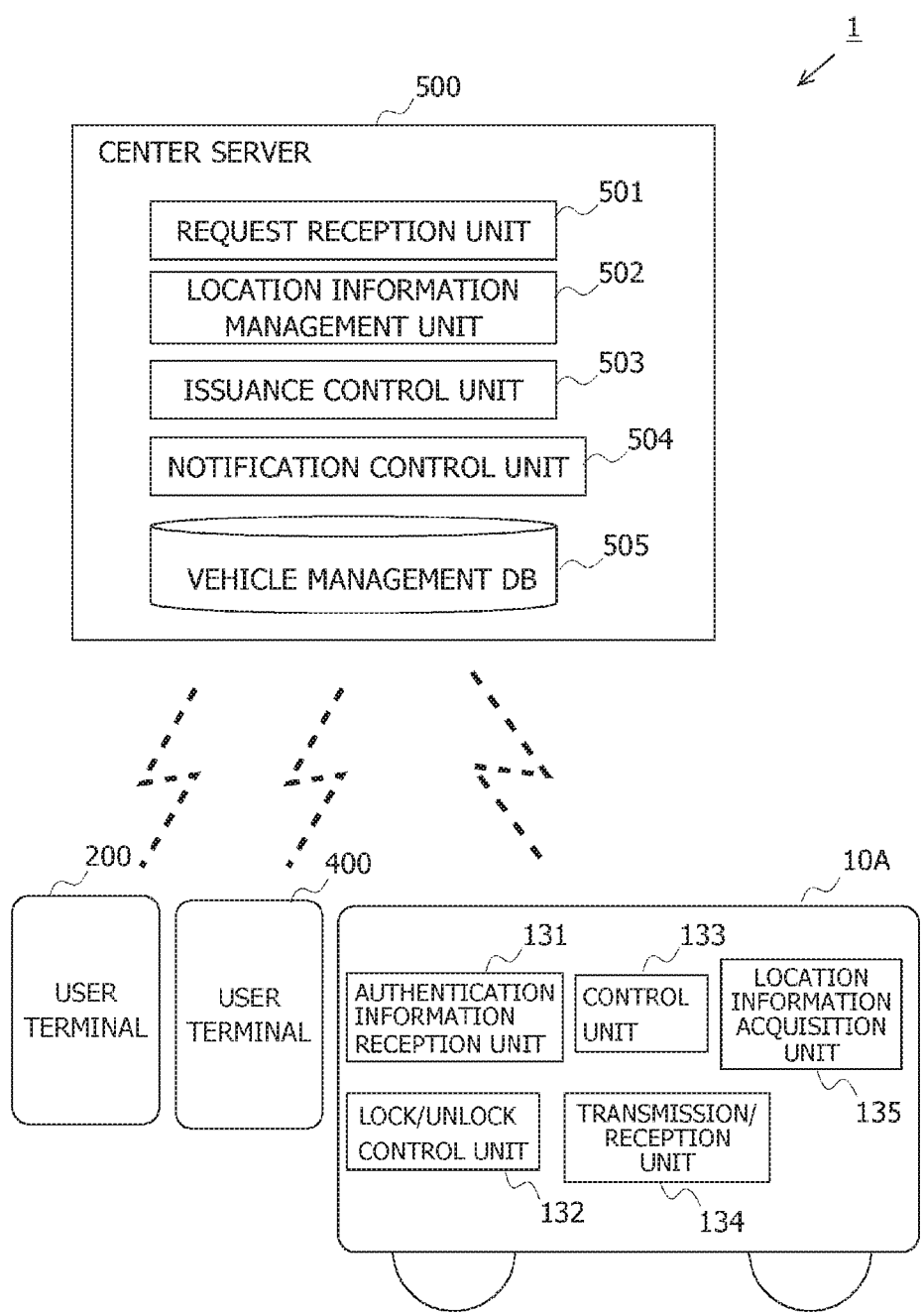
FIG. 7 is a diagram illustrating an example of functional configurations of the center server and the vehicle of the key information management system according to the first embodiment.

FIG. 7 is a diagram illustrating an example of functional configurations of the center server 500 and the vehicle 10A of the key information management system 1 according to the first embodiment. The center server 500 is caused by a computer program in the memory 52 to function as each unit illustrated in FIG. 7. That is, as functional structural elements, the center server 500 includes a request reception unit 501, a location information management unit 502, an issuance control unit 503, a notification control unit 504, and a vehicle management database (DB) 505.

For example, the request reception unit 501 receives a movement request for a blocking vehicle from the third person terminal 200, and a dispatch notification regarding an emergency vehicle from the third person terminal 200, the emergency vehicle, or a management server of the emergency vehicle. For example, vehicle specification information for specifying the blocking vehicle, such as a plate number, a model and/or a color of the blocking vehicle, location information of the third person terminal 200 which is a transmission source, and identification information of the third person terminal 200 which is the transmission source are received together with the movement request. For example, an image including the blocking vehicle captured by a camera provided in the third person terminal 200 may be received as the vehicle specification information. For example, route information of the emergency vehicle is received together with the dispatch notification regarding the emergency vehicle.

For example, the location information management unit 502 receives location information which is transmitted every predetermined period of time from each of a plurality of vehicles 10A managed by the key information management system 1, and registers the location information in the vehicle management DB 505 described later.

For example, in the case where a movement request for a blocking vehicle is received from the third person terminal 200, and in the case where a dispatch notification regarding an emergency vehicle is received, the issuance control unit 503 transmits authentication information of the blocking vehicle 10A to a predetermined third person terminal 200. For example, in the case where a movement request for a blocking vehicle is received from the third person terminal 200, the issuance control unit 503 specifies the blocking vehicle 10A based on the vehicle specification information and the location information of the third person terminal 200, which is the transmission source, received together with the movement request. The issuance control unit 503 acquires the authentication information of the specified blocking vehicle 10A from the vehicle management DB 505 described later, and transmits authentication information to the third person terminal 200 based on the authentication information.

For example, in the case where a dispatch notification regarding an emergency vehicle is received, the issuance control unit 503 specifies a blocking vehicle on the route of the emergency vehicle based on the route information of the emergency vehicle and the location information of each vehicle 10A in the system. For example, the issuance control unit 503 inquires about, and acquires, information about the third person terminal 200 present in the periphery of the specified blocking vehicle 10A, from the user terminal 200 of a general user or a terminal management server at a police station or a fire department. Information about the third person terminal 200 is information about a data transmission destination among any of email addresses, telephone numbers, terminal identification information and the like of the user terminal 200, for example. The issuance control unit 503 issues and transmits the authentication information of the blocking vehicle 10A to the third person terminal 200 which is present in the periphery of the specified blocking vehicle 10A. The issuance control unit 503 is an example of a "transmitter".

For example, when completion of movement of the blocking vehicle 10A is detected, the issuance control unit 503 performs an invalidation process for the authentication information with respect to the third person terminal 200, which is the transmission destination of the authentication information of the blocking vehicle 10A. Details of the invalidation process for the authentication information are not particularly specified as long as a specific user is disabled from performing locking/unlocking of the blocking vehicle 10A using the authentication information which is already issued. For example, the center server 500 may command the third person terminal 200 to delete the authentication information, or to set an invalid flag for the authentication information, or to rewrite an expiration date included in the authentication information to a past date.

In the case where the authentication information of the vehicle 10A is transmitted by the issuance control unit 503 to the third person terminal 200, and completion of movement of the vehicle 10A is detected, the notification control unit 504 acquires location information of the vehicle 10A after movement, and notifies the driver terminal 400 of the location information, together with a vehicle movement notification regarding the vehicle 10A. The notification control unit 504 notifies the driver terminal 400 of information about the third person who moved the vehicle 10A and invalidation of the authentication information of the vehicle 10A with respect to the third person terminal 200 to which the authentication information of the vehicle 10A was transmitted, together with the location information of the vehicle 10A.

For example, in the case of transmission of a movement completion notification regarding the vehicle 10A from the third person terminal 200, the third person who moved the vehicle 10A may be specified by issuing an inquiry to a server managing the terminal by using the identification information of the user terminal 200 which is the transmission source of the movement completion notification. In the case where a lock notification from the vehicle 10A is used as the movement completion notification regarding the vehicle 10A, the notification control unit 504 may specify the third person who moved the vehicle 10A, by having the third person terminal 200 transmit identification information of the user to the vehicle 10A, together with the authentication information, and by having the identification information of the user transmitted together with the lock notification from the vehicle 10A. Details of the processing by the notification control unit 504 will be given later. The notification control unit 504 is an example of a "controller".

For example, the vehicle management DB 505 is created in the external storage device 54 of the center server 500. For example, the vehicle management DB 505 stores vehicle management information table holding information about each vehicle 10A in the key information management system 1. The information about the vehicle 10A includes the authentication information of the vehicle 10A. Details of the vehicle management information table will be given later. The vehicle management DB 505 is an example of a "storage".

At least one of functional structural elements or a part of the processes of the center server 500 may be performed by another computer which is connected to the network. A series of processes performed by the center server 500 may be performed by hardware or software.

The vehicle 10A operates as each unit illustrated in FIG. 7 by computer programs in a memory. That is, as functional components, the vehicle 10A includes an authentication information reception unit 131, a lock/unlock control unit 132, a control unit 133, a transmission/reception unit 134, and a location information acquisition unit 135. The authentication information reception unit 131 corresponds to the key unit 100. The lock/unlock control unit 132 corresponds to the control device 300. The control unit 133, the transmission/reception unit 134, and the location information acquisition unit 135 are functional components achieved by execution of computer programs in the memory 152 by the CPU 151 of the data communication device 150, for example.

For example, the authentication information reception unit 131 receives authentication information from the driver terminal 400 or the third person terminal 200 by near field communication, and performs authentication of the driver terminal 400 or the third person terminal 200 based on the authentication information. When authentication succeeds, the authentication information reception unit 131 outputs a control request from the driver terminal 400 or the third person terminal 200 to the lock/unlock control unit 132. The control request from the driver terminal 400 or the third person terminal 200 is a lock request or an unlock request, for example.

The lock/unlock control unit 132 performs processes such as locking/unlocking of the door of the vehicle 10A and activation of the engine ECU 305, according to input of the control request from the authentication information reception unit 131.

The transmission/reception unit 134 is an interface to the center server 500, and transmits data input from another functional structural element to the center server 500, or outputs data received from the center server 500 to the control unit 133, for example.

For example, the location information acquisition unit 135 acquires, every predetermined period of time, location information of the vehicle 10A which is acquired by the GPS receiver 156 of the data communication device 150 or the like, and transmits the location information to the center server 500. The location information of the vehicle 10A is latitude and longitude, for example. Alternatively, the location information of the vehicle 10A may be an address.

For example, the control unit 133 receives an alert for checking the presence of a driver inside the vehicle 10A from the center server 500 through the transmission/reception unit 134. For example, the control unit 133 outputs the received alert to a speaker, a display or the like provided at the data communication device 150. For example, when a response to the alert is input from a user interface provided at the data communication device 150, the control unit 133 transmits the response to the center server 500 through the transmission/reception unit 134.

When a notification regarding unlocking or locking of the door is received from the lock/unlock control unit 132, the control unit 133 transmits an unlock notification or a lock notification to the center server 500 through the transmission/reception unit 134. For example, in the case of transmitting the lock notification, the location information of the vehicle 10A is also transmitted. For example, in the case where identification information of the user is received by the authentication information reception unit 131 from the user terminal 200, together with a lock request and the authentication information, the control unit 133 transmits the identification information of the user to the center server 500, together with the lock notification.

FIG. 8 is an example of the vehicle management information table. The vehicle management information table is stored in the vehicle management DB 505 of the center server 500. The vehicle management information table includes fields of a vehicle ID, vehicle information, authentication information, a vehicle location, and a driver terminal ID. In the vehicle ID field, an identification number associated with each vehicle is input.

In the vehicle information field, information which enables specification of a vehicle is input. The vehicle information field includes subfields such as a model, a color, and a plate number (vehicle registration number), for example. Additionally, subfields included in the vehicle information field are not limited thereto.

In the authentication information field, authentication information used by the key system described above is input. For example, authentication information which is transmitted to the third person terminal 200 is based on authentication information stored in the authentication information field. For example, authentication information which is transmitted to the third person terminal 200 may be a one-time key or a limited key which is valid only in a predetermined time slot. Authentication information corresponding to the authentication information is stored in advance in the key unit 100, regardless of the type of the authentication information. The issuance control unit 503 reads the authentication information input in the authentication information field corresponding to a blocking vehicle 10A, and transmits the authentication information to the third person terminal 200 which is the transmission source of a movement request for the blocking vehicle. Additionally, in the case where the authentication information to be transmitted to the third person terminal 200 is a one-time key or the like, the issuance control unit 503 generates authentication information to be transmitted to the third person terminal 200, using the authentication information input in the authentication information field corresponding to the blocking vehicle 10A, and transmits the authentication information.

In the vehicle location field, location information of the vehicle 10A is input. The location information of the vehicle 10A is transmitted from the vehicle 10A to the center server 500 every predetermined period of time, for example. When the location information is received from the vehicle 10A, the location information management unit 502 of the center server 500 updates a value in the vehicle location field for the vehicle 10A in the vehicle management information table by the received location information.

In the driver terminal ID field, identification information of the driver terminal 400 to which authentication information of the vehicle 10A is already sent is input. The user terminal 400, the identification information of which is input in the driver terminal ID field, is a terminal of a user who is successfully authenticated as a legitimate user, for example. A user who is successfully authenticated as a legitimate user is a user who may possibly be the driver of the vehicle 10A, such as an owner of the vehicle 10A, a family of the owner, or a user who is permitted by the owner of the vehicle 10A to use the vehicle 10A.

In the case where the vehicle 10A is a shared vehicle which is used by an unspecified large number of users, the user who may possibly be the driver of the vehicle 10A is a user for whom application to use the vehicle 10A is granted. Additionally, in the case where the vehicle 10A is a shared vehicle, the driver of the vehicle 10A is a user who is allowed to use the vehicle 10A at a current time point. Moreover, in the case where the vehicle 10A is a shared vehicle, identification information of the user terminal 200 of the user who is allowed to use the vehicle 10A at a current time point is input in the driver terminal ID field, and identification information of the user terminal 200 of a user who made reservation to use the vehicle 10A at another time point is not input, for example.

For example, in a case where there are a plurality of legitimate users, such as in a case where the authentication information of the vehicle 10A is held in advance in the user terminals 400 of holders of driver's license among family members of the owner of the vehicle 10A, the authentication information may be different or common for each legitimate user, for example. In this case, identification information of the terminal of each legitimate user is input in the driver terminal ID field. For example, in the case where the authentication information is different for each legitimate user, the notification control unit 504 may identify the driver terminal 400 based on the authentication information, and may transmit the vehicle movement notification to only the specified driver terminal 400. For example, in the case where the authentication information is common for the legitimate users, the notification control unit 504 may transmit the vehicle movement notification to each driver terminal 400, the identification information of which is input in the driver terminal ID field.

Identification information of the third person terminal 200 to which the authentication information of the vehicle 10A is temporarily transmitted is not input in the driver terminal ID field. This is because the third person terminal 200 is limited to the terminal of a user who is registered in advance as a user to whom the authentication information of the vehicle 10A may be temporarily transmitted in case of emergency, and is not the terminal of a user who is authenticated as the legitimate user of the vehicle 10A. That is, in the first embodiment, the third person is the owner of a user terminal, the identification information of which is not input in the driver terminal ID field with respect to one vehicle 10A.

The identification information of the third person terminal 200 to which the authentication information of the vehicle 10A is temporarily transmitted is temporarily held (not illustrated) in the memory 52 in association with the identification information of the vehicle 10A, separately from the vehicle management information table, for example. The association between the identification information of the third person terminal 200 and the identification information of the vehicle 10A is deleted from the memory 52 after a lapse of a predetermined time or when an invalidation process for the authentication information is performed with respect to the third person terminal 200, for example.

Flow of Processing

Figure 9:
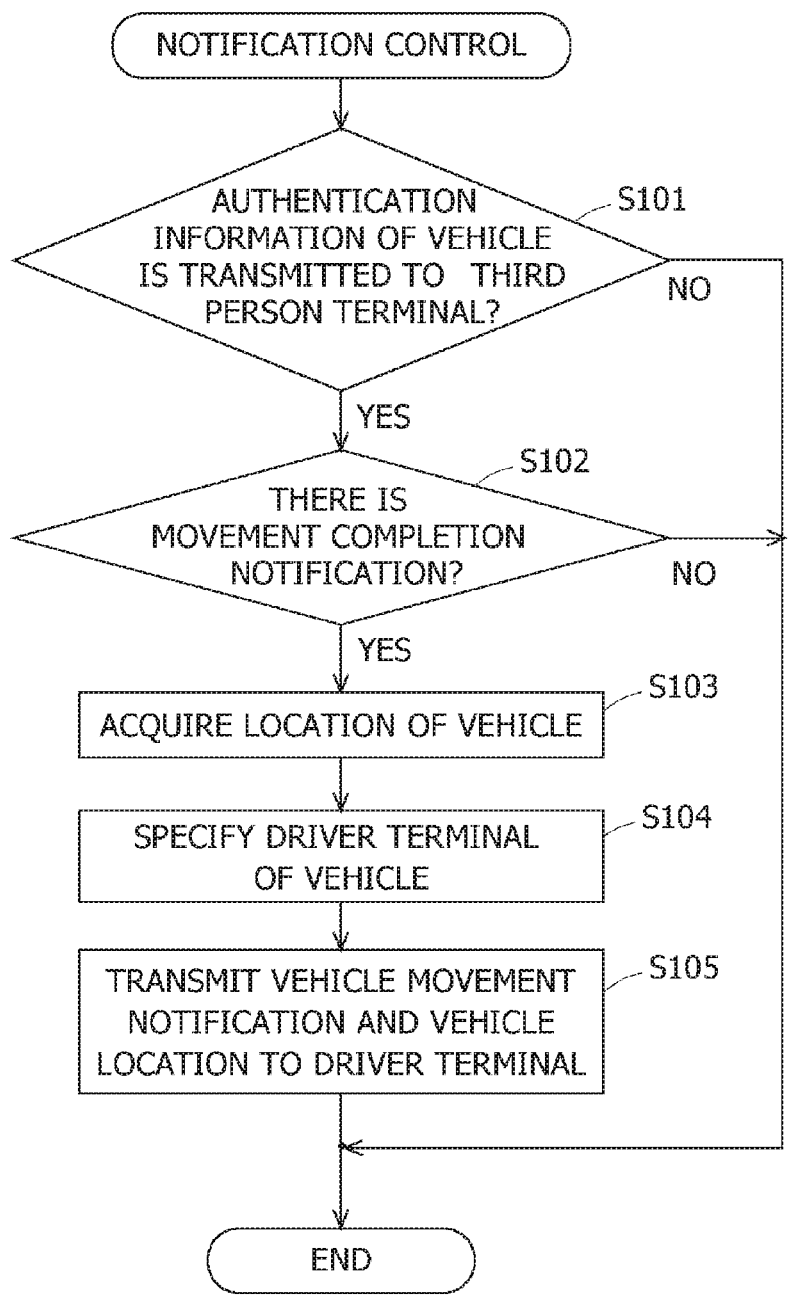
FIG. 9 is an example of a flowchart of processing by the notification control unit of the center server according to the first embodiment.

FIG. 9 is an example of a flowchart of processing by the notification control unit 504 of the center server 500 according to the first embodiment. The processing illustrated in FIG. 9 is repeatedly performed every predetermined period of time, for example. A performer of the processing illustrated in FIG. 9 is the CPU 51 of the center server 500, but a description will be given taking the notification control unit 504, which is a functional structural element, as the performer, for the sake of convenience.

In S101, the notification control unit 504 determines whether the authentication information of a vehicle 10A is transmitted to the third person terminal 200 or not. In the case where the authentication information of a vehicle 10A is transmitted to the third person terminal 200 (S101: YES), the process proceeds to S102. In the case where the authentication information of a vehicle 10A is not transmitted to the third person terminal 200 (S101: NO), the processing illustrated in FIG. 9 is ended.

In S102, the notification control unit 504 determines whether a movement completion notification regarding the vehicle 10A is received or not. Reception of a movement completion notification regarding the vehicle 10A is detected based on reception of a lock notification from the vehicle 10A, for example. In this case, the location information of the vehicle 10A is also received together with the lock notification from the vehicle 10A, for example. The identification information of a user of the user terminal 200 used to lock the vehicle 10A is also received together with the lock notification from the vehicle 10A, for example. Additionally, detection of reception of a movement completion notification regarding the vehicle 10A is not limited to be performed in the above manner, and reception of the movement completion notification regarding the vehicle 10A may alternatively be detected based on reception of a movement completion notification from the third person terminal 200. The identification information of the user of the third person terminal 200 is also received together with the movement completion notification from the third person terminal 200, for example.

In the case where a movement completion notification regarding the vehicle 10A is received (S102: YES), the process proceeds to S103. In the case where a movement completion notification regarding the vehicle 10A is not received (S102: NO), the processing illustrated in FIG. 9 is ended.

In S103, the notification control unit 504 acquires the location information of the vehicle 10A. In the case where reception of the movement completion notification regarding the vehicle 10A is detected based on reception of the lock notification from the vehicle 10A, the location information of the vehicle 10A is acquired based on the location information of the vehicle 10A which is received together with the lock notification. In the case where reception of the movement completion notification regarding the vehicle 10A is detected based on reception of the movement completion notification from the third person terminal 200, the notification control unit 504 may transmit an acquisition request for the location information to the vehicle 10A, and may acquire the location information of the vehicle 10A in the form of a response to the request. Alternatively, in this case, the notification control unit 504 may wait for update of the vehicle location field in the vehicle management information table performed based on reception of the location information from the vehicle 10A performed every predetermined period of time, and may acquire the location information of the vehicle 10A based on the value in the vehicle location field in the vehicle management information table, for example.

In S104, the notification control unit 504 specifies the driver terminal 400 corresponding to the vehicle 10A. For example, the driver terminal 400 corresponding to the vehicle 10A is acquired based on the value in the driver terminal ID field, in the vehicle management information table, corresponding to the vehicle 10A.

In S105, the notification control unit 504 transmits, to the driver terminal 400 specified in S104, a vehicle movement notification and the location information of the vehicle 10A acquired in S103. For example, the vehicle movement notification is a message for notifying of movement of the vehicle 10A. The location information of the vehicle 10A which is transmitted together with the vehicle movement notification may be presented to the driver, at the driver terminal 400, as an address of a current location of the vehicle 10A or a current location on a map, for example. Information about the user who moved the vehicle 10A, and a notification indicating that the authentication information of the vehicle 10A is invalidated for the third person terminal 200 to which the authentication information of the vehicle 10A was transmitted are also transmitted together with the vehicle movement notification regarding the vehicle 10A. Information about the user who moved the vehicle 10A may be contact information such as a telephone number or an email address of the user terminal 200 of the user, an attribute of the user (ambulance crew, police officer, etc.) or the like, for example. The processing illustrated in FIG. 9 is then ended.

Figure 10:
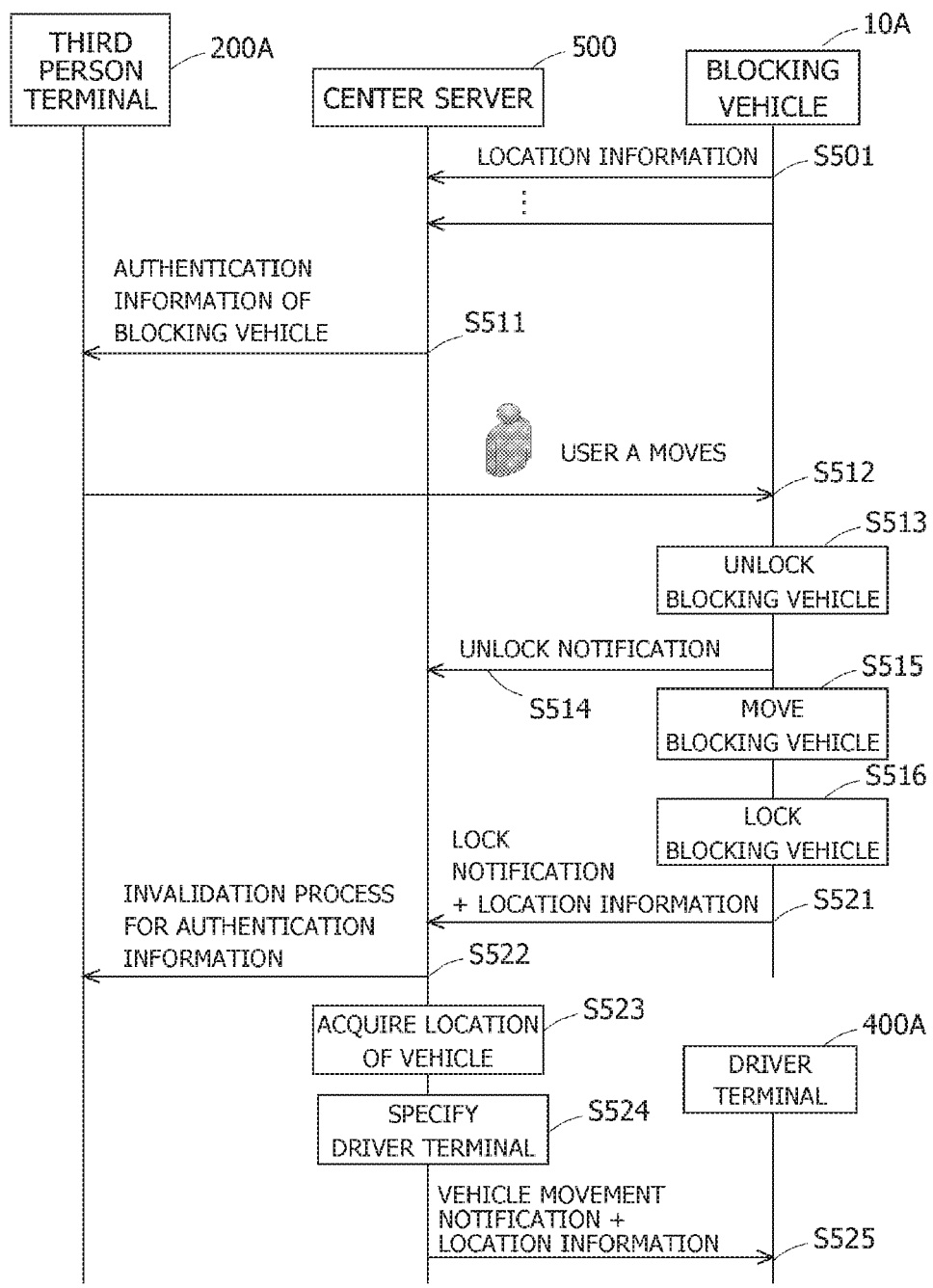
FIG. 10 is an example of a process sequence of a specific example of the first embodiment.

FIG. 10 is an example of a process sequence of a specific example of the first embodiment. As the specific example, an example is described where a vehicle movement notification is transmitted to a driver terminal 400A corresponding to a blocking vehicle 10A in a case where the authentication information of the blocking vehicle 10A is transmitted to a third person terminal 200A and movement is performed by a user A corresponding to the third person terminal 200A. The user A is a general user, and is a third person to the vehicle 10A. The user A carries a driver's license.

In S501, the blocking vehicle 10A transmits the location information to the center server 500 every predetermined period of time. Although not illustrated, the blocking vehicle 10A thereafter keeps transmitting the location information to the center server 500 every predetermined period of time. For example, the blocking vehicle 10A is assumed to be a vehicle which is parked in the street, and an occupant, such as the driver, of which is absent.

In S511, when a movement request for the blocking vehicle is received from the third person terminal 200A, or when the blocking vehicle 10A is detected based on a dispatch notification regarding an emergency vehicle and the third person terminal 200A is detected as the user terminal of a general user in the periphery of the blocking vehicle, the center server 500 transmits the authentication information of the blocking vehicle 10A to the third person terminal 200A (FIG. 9; S101: YES).

In S512, the user A moves to the blocking vehicle 10A, carrying the third person terminal 200A holding the authentication information of the blocking vehicle 10A. In S513, the user A unlocks the door of the blocking vehicle 10A by using the authentication information of the blocking vehicle 10A saved in the third person terminal 200A. The door of the blocking vehicle 10A is thereby unlocked, and the engine is placed in a state where it can be started. In S514, the blocking vehicle 10A transmits an unlock notification to the center server 500.

In S515, the user A gets in the blocking vehicle 10A, starts the engine of the blocking vehicle 10A, moves the blocking vehicle 10A to another place, and parks the blocking vehicle 10A. In S516, the user A locks the door of the blocking vehicle 10A by using the authentication information of the blocking vehicle 10A saved in the third person terminal 200A.

In S521, the blocking vehicle 10A transmits a lock notification and the location information of the blocking vehicle 10A to the center server 500. The center server 500 receives the lock notification and the location information from the blocking vehicle 10A. In the example illustrated in FIG. 10, the center server 500 receives the lock notification from the vehicle 10A to thereby detect reception of a movement completion notification regarding the vehicle 10A. Accordingly, in S521, the center server 500 detects reception of the movement completion notification regarding the vehicle 10A (FIG. 9; S102: YES).

In S522, the center server 500 performs an invalidation process for the authentication information of the vehicle 10A with respect to the third person terminal 200A of the user A. Accordingly, the user A is thereafter prevented from locking/unlocking the vehicle 10A.

In S523, the center server 500 acquires the location information of the vehicle 10A (FIG. 9, S103). In the example illustrated in FIG. 10, the center server 500 acquires the location information of the vehicle 10A from the location information of the vehicle 10A which is received together with the lock notification. In S524, the center server 500 specifies the driver terminal 400A corresponding to the vehicle 10A (FIG. 9, S104).

In S525, the center server 500 transmits a vehicle movement notification and the location information of the vehicle 10A to the driver terminal 400A (FIG. 9, S105). Information about the user A and a notification indicating that the authentication information which was transmitted to the third person terminal 200A is invalidated are also transmitted together with the vehicle movement notification. The driver of the vehicle 10A is thereby enabled to grasp the location of the vehicle 10A after movement, and go to the location of the vehicle 10A after movement without confused.

Operation and Effects of First Embodiment

In the first embodiment, in the case where a vehicle 10A is moved by a third person, other than the driver, by using the third person terminal 200 which received the authentication information of the vehicle 10A, the driver of the vehicle 10A is notified of the location information of the vehicle 10A after movement. Accordingly, even if the vehicle 10A is moved without knowledge of the driver of the vehicle 10A, the driver of the vehicle 10A may be prevented from becoming confused.

In the first embodiment, when completion of movement of the vehicle 10A by the third person is detected, an invalidation process for the authentication information of the vehicle 10A is performed with respect to the third person terminal 200. The security of the vehicle 10A may thereby be maintained.

In the first embodiment, the driver terminal 400 of the vehicle 10A is notified of information about the third person who moved the vehicle 10A by using the authentication information of the vehicle 10A, together with the vehicle movement notification and the location information of the vehicle 10A. Accordingly, the driver of the vehicle 10A may grasp the information about the third person who moved the vehicle 10A. For example, in the case where the vehicle 10A is moved by a malicious third person, and there is an abnormality in the vehicle 10A after movement, the cause of the abnormality may be specified. Accordingly, by notifying the driver terminal 400 of the vehicle 10A of the information about the third person who moved the vehicle 10A by using the authentication information of the vehicle 10A, the driver of the vehicle 10A may feel safe about security of the vehicle 10A. A deterrent effect on crime such as theft may also be achieved with respect to a third person who moves the vehicle 10A.

In the first embodiment, in addition to the vehicle movement notification and the location information of the vehicle 10A, the driver terminal 400 of the vehicle 10A is notified of invalidation of the authentication information of the vehicle 10A with respect to the third person terminal 200 to which the authentication information of the vehicle 10A was transmitted. The driver of the vehicle 10A may thereby check that the third person who moved the vehicle 10A is disabled from locking/unlocking the vehicle 10A and from starting the engine, and the driver of the vehicle 10A may feel safe about security of the vehicle 10A.

Others

In the first embodiment, a description is given citing as an example the vehicle 10A adopting a key system according to which locking/unlocking is performed based on reception of key information which is transmitted from a terminal, but the vehicle 10A is not limited to a vehicle adopting the key system. For example, as in Japanese Patent Laid-Open No. 2007-328602 and Japanese Patent Laid-Open No. 2005-104327, the system described in the first embodiment may be applied to any vehicle with respect to which unlocking can be performed and the engine can be started based on signals from the center server 500, and which includes a function which allows the center server 500 to acquire the location information of the vehicle.

Recording Medium

A program for causing a computer, other machine and an apparatus (hereinafter, a computer, or the like) to implement processing of the above-described center server 500 can be recorded in a computer readable recording medium. By causing the computer, or the like, to read and execute the program in the recording medium, the computer functions as the above-described center server 500.

Here, the computer readable recording medium refers to a non-transitory recording medium in which information such as data and programs is accumulated through electric, magnetic, optical, mechanical or chemical action and from which the information can be read from a computer, or the like. Among such a recording medium, examples of a recording medium which is detachable from the computer, or the like, can include, for example, a flexible disk, a magnetooptical disk, a CD-ROM, a CD-R/W, a DVD, a blu-ray disk, a DAT, an 8 mm tape, a memory card such as a flash memory, or the like. Further, examples of a recording medium fixed at the computer, or the like, can include a hard disk, a ROM (read only memory), or the like. Still further, an SSD (Solid State Drive) can be utilized both as a recording medium which is detachable from the computer, or the like, and a recording medium which is fixed at the computer, or the like.

What is claimed is:

1. A vehicle movement notification device comprising:
    a transmitter configured to transmit key information of a vehicle to a first terminal present in a periphery of the vehicle, in a case where there is occurrence of a request for movement of the vehicle, the vehicle adopting a key system according to which locking or unlocking is performed based on reception of the key information that is transmitted from a predetermined terminal used by an owner of the vehicle or used by a user allowed to use the vehicle by the owner of the vehicle, wherein the first terminal is not the predetermined terminal, and no information on a first user who uses the first terminal is set for using the first vehicle in advance of transmitting the key information;
    a receiver configured to receive a notification of movement of the vehicle, when the vehicle is moved by unlocking of the vehicle and starting of a drive source performed by using the key information of the vehicle, by the first user; and
    a controller configured to acquire location information of the vehicle after the movement, and transmit the location information of the vehicle to the predetermined terminal.

2. The vehicle movement notification device according to claim 1, further comprising a storage that stores an association between information about the vehicle and information about the user of the vehicle,
    wherein the controller is configured to acquire the information about the user of the vehicle that is associated with the vehicle from the storage, in a case where the notification of movement of the vehicle is received.

3. The vehicle movement notification device according to claim 1, wherein the controller is configured to notify of information about the first user, together with the location information of the vehicle after movement.

4. The vehicle movement notification device according to claim 1, wherein the controller is configured to transmit, together with the location information of the vehicle after the movement, a notification indicating that the key information of the vehicle received by the first terminal is already invalidated.

5. A vehicle movement notification method comprising:
    transmitting key information of a vehicle to a first terminal present in a periphery of the vehicle, in a case where there is occurrence of a request for movement of the vehicle, the vehicle adopting a key system according to which locking or unlocking is performed based on reception of the key information that is transmitted from a predetermined terminal used by an owner of the vehicle or used by a user allowed to use the vehicle by the owner of the vehicle, wherein the first terminal is not the predetermined terminal, and no information on a first user who uses the first terminal is set for using the first vehicle in advance of transmitting the key information;
    receiving a notification of movement of the vehicle, when the vehicle is moved by unlocking of the vehicle and starting of a drive source performed by using the key information of the vehicle, by the first user; and
    acquiring location information of the vehicle after the movement, and transmitting the location information of the vehicle to the predetermined terminal.

* * * * *